United States Patent [19]
Millard et al.

[11] 4,173,081
[45] Nov. 6, 1979

[54] VIDEO GENERATOR FOR USE IN A SYNTHETIC TERRAIN GENERATOR

[75] Inventors: Maurice Millard, Binghamton; David L. Peters, Whitney Point; John R. Trzeciak, Binghamton; Brian J. Woycechowsky, Vestal, all of N.Y.

[73] Assignee: The Singer Company, Binghamton, N.Y.

[21] Appl. No.: 886,385

[22] Filed: Mar. 14, 1978

[51] Int. Cl.² .............................................. G09B 9/08
[52] U.S. Cl. .................................. 35/12 N; 358/104
[58] Field of Search ........................ 35/12 N; 358/104

[56] References Cited

U.S. PATENT DOCUMENTS

| 3,060,596 | 10/1962 | Tucker et al. | 35/12 N X |
|---|---|---|---|
| 3,098,929 | 7/1963 | Kirchner | 35/12 N X |
| 3,418,459 | 12/1968 | Purdy et al. | 35/12 N X |
| 3,439,105 | 4/1969 | Ebeling et al. | 35/12 N X |
| 3,520,994 | 7/1970 | McAfee et al. | 35/10.2 X |
| 3,605,083 | 9/1971 | Kramer | 340/27 NA |
| 3,643,258 | 2/1972 | Balding | 340/27 NA X |
| 3,833,759 | 9/1974 | Yatabe et al. | 35/12 N X |
| 3,911,597 | 10/1975 | Millard et al. | 35/12 N |
| 4,054,917 | 10/1977 | Race | 35/12 N X |

Primary Examiner—William H. Grieb
Attorney, Agent, or Firm—J. Dennis Moore; Richard J. Paciulan; Jeff Rothenberg

[57] ABSTRACT

Over wide altitude ranges, signals representative of the altitude of an eyepoint viewing a synthetic grid pattern on a ground reference plane are scaled to provide strong signals. These strong signals are used to electronically define the intersection of a line of sight from the eyepoint to the grid pattern so that a clearly defined grid pattern as viewed over the wide altitude range can be displayed.

11 Claims, 12 Drawing Figures

| H (KILOMETERS) | $(sf_1)$ | $(sf_2)$ | $(sf_1)(I_{e1})\left(\dfrac{R_3}{R_1}\right)$ | + | $(sf_2)(I_{e3})(\int \dot{x}\,dt)\left(\dfrac{R_3}{R_2}\right)$ | = | $(V_O)'$ (VOLTS) |
|---|---|---|---|---|---|---|---|
| 4.0 | 1.0 | .24 | 8.0 | + | 1.9 | = | 9.9 |
| 2.0 | .83 | .40 | 6.6 | + | 3.3 | = | 9.9 |
| 1.0 | .62 | .60 | 5.0 | + | 5.0 | = | 10.0 |
| .5 | .42 | .80 | 3.4 | + | 6.6 | = | 10.0 |
| .2 | .21 | 1.0 | 1.7 | + | 8.3 | = | 10.0 |

VIDEO GENERATOR FOR USE IN A SYNTHETIC TERRAIN GENERATOR

BACKGROUND OF THE INVENTION

1. Field of the Invention

This invention relates to an improved Synthetic Terrain Generator (STG), and more particularly to an STG which has the capability of continually generating a clear image of a simulated terrain as the eyepoint viewing the terrain varies over a wide range of altitudes.

2. Description of the Prior Art

Use of an aircraft simulator is a modern well known method of training aircraft personnel. In a simulator the trainee is placed in a realistically recreated aircraft environment such that the trainee feels he is in and operating an actual aircraft without leaving the ground.

An important element that is used to create this realism is the visual display system. Many training judgments depend on the student's response to a visual cue. During flight operation a pilot views his external environment through his aircraft window. For instance, while taking off and landing he scans the terrain and operates his controls to properly maneuver his aircraft.

Some modern simulators employ synthetic terrain generators (STG) of the type described in U.S. Pat. No. 3,911,597 (hereinafter referred to as Millard). The STG utilizes the viewing surface of a raster scanned television display to simulate a window view. A line of sight from an eyepoint through the screen of the display to the synthetic terrain is electronically represented. When this line of sight intersects a grid line of the synthetic terrain an electronically defined null relationship is established. A video pulse representing the intersection of the line of sight with the grid line is provided to display means for presentation of the grid intersection point on the viewing surface. The resultant image on the display is a grid pattern composed of two intersecting groups of grid lines defining a synthetic terrain.

The null relationship is essentially a comparison of signals representing terms defining the line of sight and signals representing the grid line locations. One factor in the line of sight terms is the altitude (H) of the eyepoint above the ground reference plane upon which the grid pattern is located. The altitude plays a key role. The grid pattern must become smaller as the eyepoint gets higher in altitude and further away from the ground surface being viewed. In the same manner, the grid pattern must enlarge as the altitude decreases. For altitudes employed by modern aircraft simulators a clear representation on the viewing surface of the grid pattern must be provided so that an accurate image can be viewed by a trainee. Poor images defeat the purpose of simulating an aircraft's environment.

In the prior art STG a north-south video generator and an east-west video generator, one generator for each horizontal direction defining the grid pattern, are each responsive to a signal representative of the altitude of the eyepoint. Each is also responsive to signals representative of vertical earth direction cosine values, its respective horizontal earth direction cosine signal, and signals representative of the velocity of the aircraft. A signal is then generated within each video generator defining the line of sight in terms of those signals feeding the video generator. In generating the line of sight, the magnitude of the signal (h) that represents the altitude (H) increases and decreases linearly in direct relation to an increase or decrease in altitude. Because the altitude signal (h) varies linearly with altitude a disadvantage of the prior art STG becomes apparent.

Over broad altitude ranges a maximum (h) signal corresponding to a high altitude value would drop to a very small magnitude (h) signal at some low altitude value. For example, if 10 volts corresponded to an altitude of 10,000 meters, 10 milli-volts would correspond to an altitude of 10 meters. On the other hand, if a maximum signal corresponded to some low altitude the signal level would drop linearly to a very small magnitude at the high altitude.

When very small signals are processed signal strength levels become comparable to noise levels. Subsequent signal processing cannot distinguish signal from noise. In the prior art STG, weak altitude signals result in noisy display signals causing a blurred grid pattern on the viewing surface of the raster scanned television display at those values of altitude where the altitude signal is weak.

With aircraft and other type simulators being extensively used as training devices, a need arises for clearly defined visual images. It therefore becomes particularly necessary to provide an STG which has the capability of continually generating a clear image of a simulated terrain as the eyepoint viewing the terrain varies over a wide range of altitudes.

SUMMARY OF THE INVENTION

It is therefore a principal object of the present invention to provide an improved video generator for use in a synthetic terrain generator whereby signal processing for a selected altitude range will result in a clear depiction of the synthetic terrain as an eyepoint varies over the selected altitude range.

It is another object of the present invention to provide an improved video generator for use in a synthetic terrain generator whereby signal processing for an extended altitude range in excess of the selected altitude range will yield a clear depiction of the synthetic terrain as the eyepoint varies over the extended altitude range.

According to the present invention the signal representative of the altitude is converted into both a first scaling function signal and a second scaling function signal. Each horizontal earth direction cosine signal is scaled in proportion to the first scaling function signal. The vertical earth direction cosine signal is scaled in proportion to the second scaling function signal. The scaled earth direction cosine signals and signals representative of the horizontal velocity of the aircraft are then used to electronically define a null relationship indicating a line of sight intersection with a grid line. The resulting grid pattern displayed will be a sharply defined clear image over a broad range of altitude.

The foregoing and other features and advantages will become more apparent in light of the following detailed description of the preferred embodiment thereof as illustrated in the accompanying drawings.

DETAILED DESCRIPTION

The synthetic terrain generator as described in Millard generates signals representing each term in the expressions:

$$I_{e3}(N-S)g = (I_{e1})H + I_{e3}\int \overset{\circ}{x}\, dt \qquad (1)$$

and $$I_{e3}(E-W)g = (I_{e2})H + I_{e3}\int \overset{\circ}{y}\, dt \qquad (2)$$

where $I_{e1}$ and $I_{e2}$ are the horizontal earth direction cosines,
$I_{e3}$ is the vertical earth direction cosine,
H is the operating altitude,
(N−S)g is a distance along the first horizontal axis to a grid line,
(E−W)g is a distance along the second horizontal axis to a grid line,
$\overset{\circ}{x}$ is the component of the simulated velocity of the aircraft along the first horizontal axis and $\int \overset{\circ}{x}\, dt$ is the component of the simulated translation along the first horizontal axis,
$\overset{\circ}{y}$ is the component of the simulated velocity of the aircraft along the second horizontal axis and $\int \overset{\circ}{y}\, dt$ is the component of the simulated translation along the second horizontal axis, and
t is time.

Figure 1:
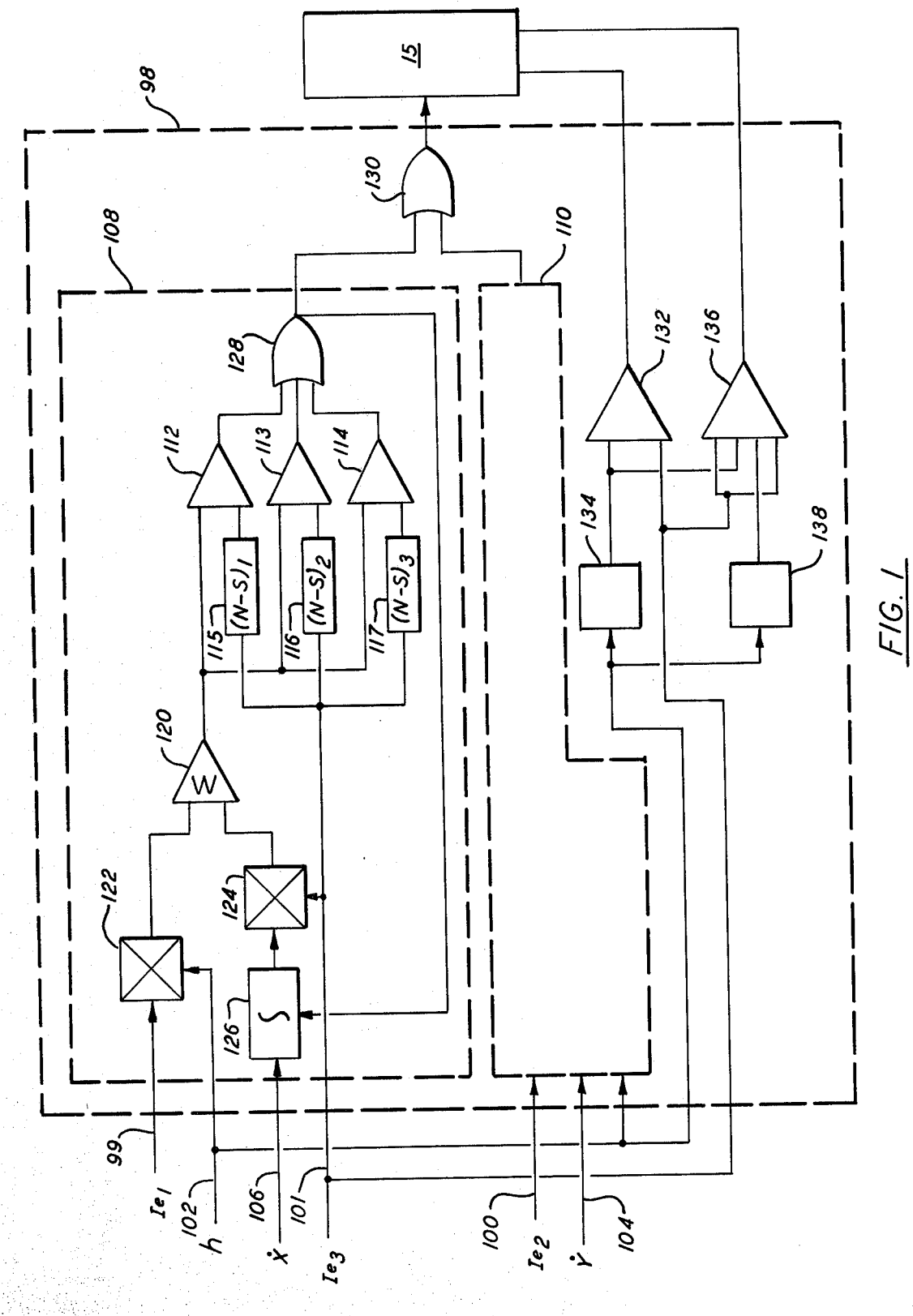
FIG. 1 is a block diagram of a portion of a prior art STG.

In FIG. 1 is shown the prior art STG video generation network of Millard. The numerical references and operation description of Millard are incorporated herein by reference.

North-South video generator 108 and East-West video generator 110 of FIG. 1 are responsive to the signals representative of $I_{e1}$, $I_{e2}$, $I_{e3}$, H, $\overset{\circ}{x}$ and $\overset{\circ}{y}$. The means set forth in the video generators perform the task of solving the aforementioned expressions (1) and (2) which define null relationships representative of an intersection of a line of sight from the eyepoint with grid lines. A video pulse is provided to the display means when the horizontal and vertical earth direction cosine signals and signals representative of the altitude and horizontal velocity of the aircraft concurrently have values in accordance with the null relationships (1) and (2).

To operate an aircraft simulator a selected range of altitudes through which the aircraft might be flying is predetermined. Any range of altitudes can be used from 0 on the ground to approximately 7 kilometers. Above 7 kilometers the distance to the ground is so great that the grid pattern, typically consisting of 0.5 kilometer squares, becomes indistinguishable. For discussion purposes a range of altitudes from 200 meters as a minimum to 4 kilometers as a maximum will be defined as the selected operating altitude range.

Figure 2:
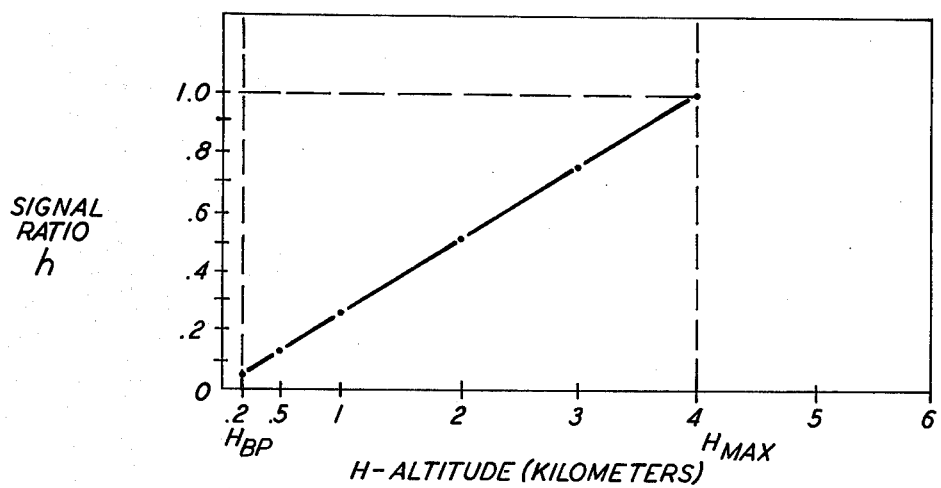
FIG. 2 is a graph showing a signal ratio as a function of altitude.

Consider first the prior art Millard STG. A signal (h) would be generated representing each altitude from 200 meters, designated hereinafter as minimum value $H_{BP}$ of the selected altitude range, to 4 kilometers, designated maximum altitude $H_{max}$ of the selected altitude range. Referring to FIG. 2, a graph shows a signal ratio representing the altitude (H) as defined as a function of (H). Since multiplying circuitry employed in simulators process signals by ratios, absolute signal strengths are divided by their maximum value and thereby have their maximum value set at one. This maximum value can be easily related to the maximum operating signal level of the components processing the signal ratio. For example, typical components have maximum levels of 10 volts. A maximum signal ratio of 1 can thereby be considered to be 10 volts.

In the graph shown in FIG. 2 a maximum signal ratio of 1 is set at H max (4 kilometers). The signal strength then decreases linearly as the altitude decreases to $H_{BP}$ (0.2 kilometers). In the prior art STG of FIG. 1 the (h) signal as shown in FIG. 2 is fed through signal line 102 to Multiplier 122. Multiplier 122 multiplies the (h) signal by horizontal earth direction cosine signal $I_{e1}$ to produce a signal representing $hI_{e1}$. Amplifier 120 combines the $hI_{e1}$ signal with a signal representing $\int \overset{\circ}{x} I_{e3}$, the sum of which is the output signal appearing from amplifier 120 and hereinafter referred to as Vo.

Figure 3:
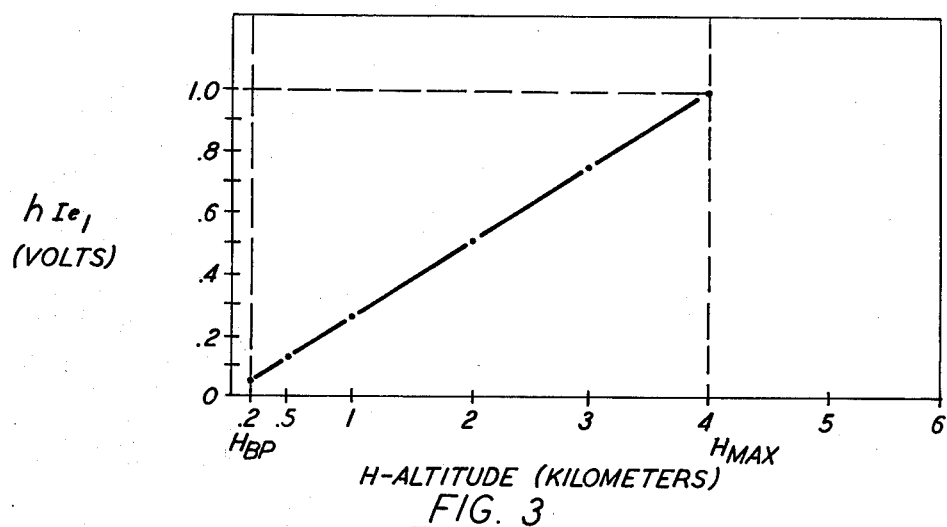
FIG. 3 is a graph showing the signal $hI_{el}$ as a function of altitude.

Referring to FIG. 3, a graph is shown relating the output $hI_{e1}$ of multiplier 122 in terms of altitude (H). With $hI_{e1}$ having a maximum of 1 volt from a typical multiplier, very weak signals appear from multiplier 122 at low values of altitude. The weak signal would then combine with the signals $\int \overset{\circ}{x} I_{e3}$ in amplifier 120. Vo becomes weak in proportion to the decreasing $hI_{e1}$ signal as the aircraft altitude varies from $H_{max}$ to $H_{BP}$. When this weak Vo signal is fed to comparators 112–114 of FIG. 1, the processing occurring in comparators 112–114, which defines the null relationship, will compare a strong signal with a weak signal. If the altitude range is broad enough, the weak signal approaches the noise level and the comparison becomes faulty. Further processing results in a fuzzy grid pattern being ultimately displayed on the viewing surface.

According to the present invention the signal representative of the altitude is converted into two scaling function signals, a first scaling function signal ($sf_1$), and a second scaling function signal ($sf_2$) for values of (H) in the selected altitude range of $H_{BP}$ to $H_{max}$.

The ($sf_1$) signal is expressed or approximated by any form defining the relationship:

$$(sf_1) = (f_1)(1/F_1) \qquad (3)$$

and the ($sf_2$) signal can be expressed or approximated by any form defining the relationship:

$$(sf_2) = \frac{(1)}{f_2}(F_2) \qquad (4)$$

$$\text{where } f_1 = \frac{H(1 + \sqrt{H_{min}}\sqrt{H_{max}})}{\sqrt{H_{min}}(H + 1)} \qquad (5)$$

$$\text{and } f_2 = \frac{\sqrt{H_{min}} (H + 1)}{1 + \sqrt{H_{min}} \sqrt{H_{max}}} \quad (6)$$

$F_1$ is the maximum value of $f_1$; $F_2$ is the maximum value of $f_2$; H is the simulated altitude; $H_{max}$ is the maximum value of the selected altitude range; and $H_{min}$ is related to the minimum value $H_{BP}$ of the selected altitude range by the relationship $\sqrt{H_{min}} = H_{BP}/\sqrt{H_{max}}$. Both $(sf_1)$ and $(sf_2)$ are expressed as ratios of functions relative to maximum function values so as to be readily adaptable to electronic calculation employing ratio signal processors.

Figure 4:
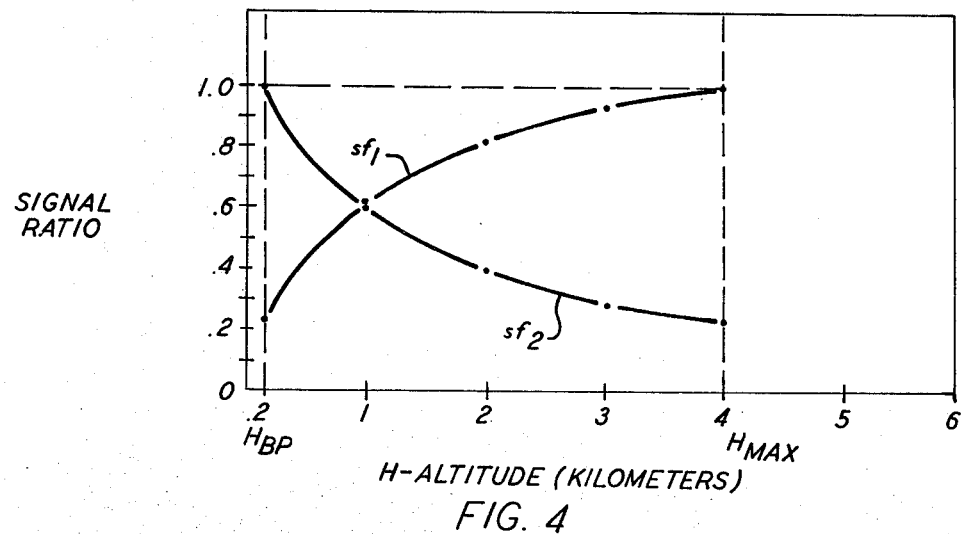
FIG. 4 is a graph showing scaling function signals as a function of altitude.

In FIG. 4 the values of $(sf_1)$ and $(sf_2)$ are shown on a graph in terms of altitudes ranging from a minimum value $H_{BP}$(0.2 kilometers) to a maximum value $H_{max}$ (4.0 kilometers).

The terms of null relationship expressions (1) and (2) are selectively scaled by the $(sf_1)$ and $(sf_2)$ scaling functions to convert the expressions (1) and (2) into the following new null relationship expressions (7) and (8):

$$(sf_2)I_{e3}(N-S)g = (sf_1)I_{e1} + (sf_2)I_{e3} \int \overset{\circ}{x} \, dt \quad (7)$$

and $$(sf_2)I_{e3}(E-W)g = (sf_1)I_{e2} + (sf_2)I_{e3} \int \overset{\circ}{y} \, dt \quad (8)$$

When the terms of the new null relationship expressions (7) and (8) are electronically defined, strong signals will be fed to the comparators. The new null relationship will be established over the entire selected altitude range defined by signals having strong magnitudes. A clear grid pattern will then be displayed on the viewing surface for any point in the selected altitude range.

Figure 5:
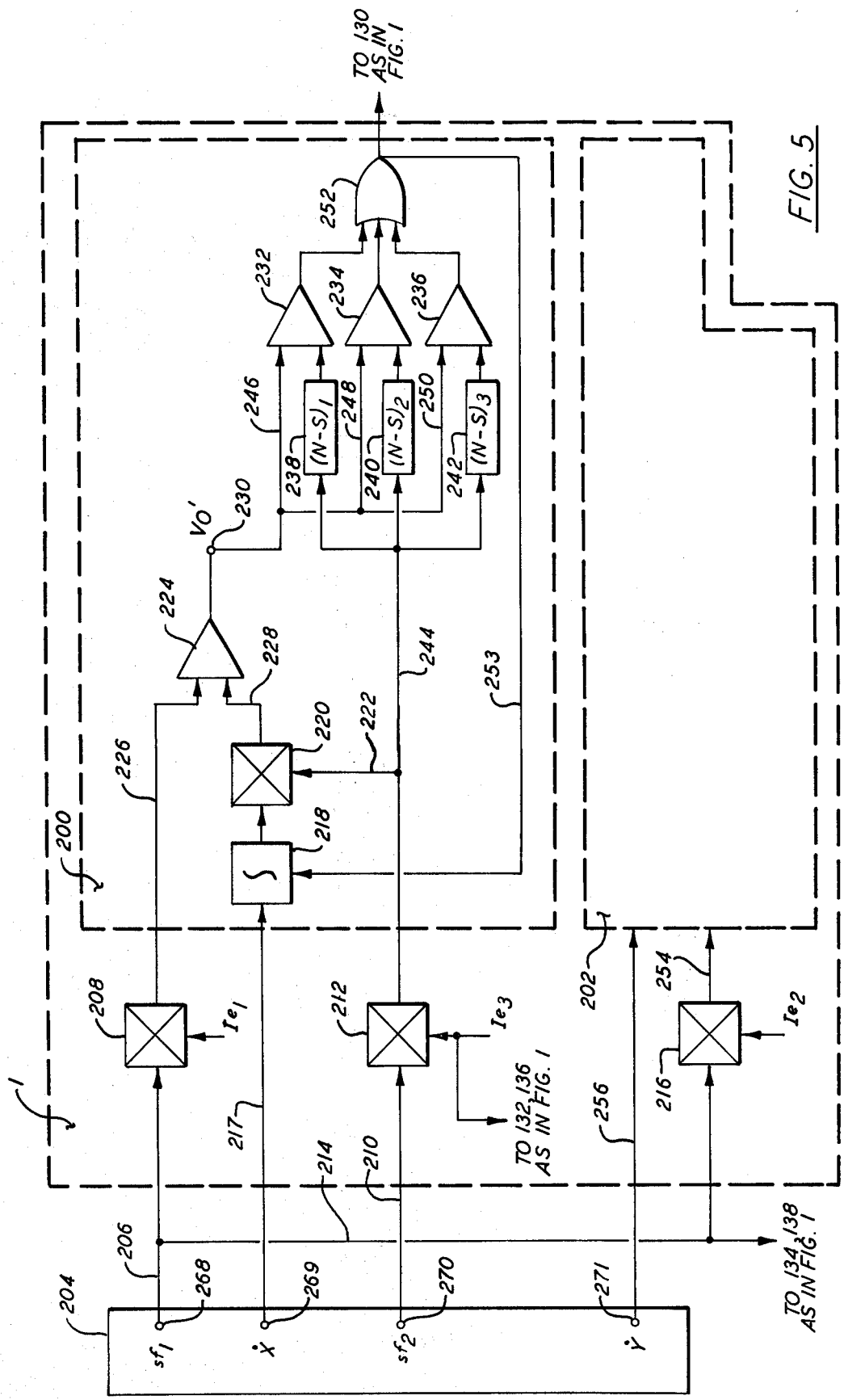
FIG. 5 is a block diagram showing the preferred embodiment of the present invention.

FIG. 5 shows the preferred embodiment of the present invention. The video generator 1 consists of a North-South video generator 200, an East-West video generator 202, and multipliers 208, 212 and 216. A North-South video generator 200 establishes whether a line of sight intersects a East-West grid line. An East-West video generator 202 establishes whether a line of light intersects a North-South grid line. A computer 204 generates signals representative of the terms $(sf_1)$, $(sf_2)$, $\overset{\circ}{x}$, and $\overset{\circ}{y}$. $(sf_1)$ is fed from the computer port 268 by line 206 to multiplier 208. Multiplier 208 combines $(sf_1)$ and $I_{e1}$ to produce $(sf_1) I_{e1}$ signal, a scaled horizontal earth direction cosine signal. $(sf_2)$ is fed from the computer port 270 by line 210 to multiplier 212. Multiplier 212 combines $(sf_2)$ and $I_{e3}$ to produce a $(sf_2) I_{e3}$ signal, a scaled vertical earth direction cosine signal. $(sf_1)$ is also fed from the computer by line 214 to multiplier 216. Multiplier 216 combines $(sf_1)$ and $I_{e2}$ to produce a $(sf_1) (I_{e2})$ signal, a second scaled horizontal earth direction cosine signal for use by video generator 202. To integrator circuit 218 is fed horizontal velocity signal $\overset{\circ}{x}$ from computer port 269 by line 217. Integrator circuit 218 converts the horizontal velocity signal $\overset{\circ}{x}$ into a signal $\int \overset{\circ}{x} \, dt$ representative of the horizontal translation of the aircraft. The signal $\int \overset{\circ}{x} \, dt$ is then fed from integrator 218 to multiplier 220. Multiplier 220 also receives a $(sf_2) I_{e3}$ signal from the output of multiplier 212 by line 222. A signal representing the term $(sf_2)(I_{e3}) \int \overset{\circ}{x} \, dt$ is then output from multiplier 220. Summing amplifier 224 receives the $(sf_1) I_{e1}$ signal from multiplier 208 by line 226 and also receives the $(sf_2)(I_{e3}) \int \overset{\circ}{x} \, dt$ signal from multiplier 220 by line 228. An output (Vo)' at 230 from the summing amplifier 224 is a signal proportional to the term $(sf_1)I_{e1} + (sf_2)(I_{e3}) \int \overset{\circ}{x} \, dt$ which is representative of the line of sight intersection point on said reference plane. (Vo)' must now be compared with signals representative of the grid line locations to determine if the line of sight intersection point on the reference plane coincides with a grid line location.

Comparators 232, 234, 236 through attenuation networks 238, 240, 242 respectively receive the signal $(sf_2) I_{e3}$ by line 244. The attenuation networks each have a transmission in proportion to the displacement of three equally spaced grid lines in the East-West direction. The networks 238, 240, 242 respectively provide voltages proportional to the term $(sf_2) I_{e3}$ (N-S)g, for three East-West grid lines.

Comparators 232, 234, 236 receive the (Vo)' signal by lines 246, 248, 250 respectively. The comparators 232, 234, 236 are of the type which provide a negative voltage of approximately $-0.7$ volts (referred to as a One hereinafter) in response to equal voltages applied at the inputs thereof. Approximately $-1.8$ volts is provided (referred to as zero hereinafter) in response to unequal input voltages. Therefore, the comparators 232, 234, 236 respectively provide One in accordance with the new North-South null relationship (7) defining an intersection of the line of sight with an East-West grid line.

The outputs of comparators 232, 234, 236 are respectively connected to an OR gate 252. The gate 252 provides One in response to One applied at any input thereof. The One is then further processed as in Millard to display the intersection points located on an East-West grid line.

The output of the gate 252 is also connected to a reset input of integrator 218 by line 253 thereby providing a One thereto in response to One provided by comparators 232, 234, 236. In response to the application of One to the reset input, the output of the integrator 218 is reset to provide zero volts. It should be understood that in the simulated translation, each successively encountered grid line is indistinguishable from a previously encountered grid line because of the equal spacing therebetween. Therefore, resetting of the integrator 218 in accordance with the North-South null relationship prevents a translation away from the grid lines represented by the networks 238, 240, 242.

The East-West generator 202, substantially identical to the generator 200, provides One in accordance with the new East-West null relationship (8). The $(sf_1)(I_{e2})$ signal is fed from multiplier 216 to the generator 202 by line 254. The $\overset{\circ}{y}$ signal is fed from the computer port 271 to the generator 202 by line 256. The new East-West null expression is generated in the same manner as in generator 200. A One output is provided in accordance with the East-West null relationship defining an intersection of the line of sight with a North-South grid line.

Other means such as elements 130, 134, 136, 138 and 140 included in FIG. 1 are not shown in FIG. 5 but are included in the present invention and operate in the same manner as described in Millard.

The advantages achieved by the scaling of the earth direction cosine voltages can be seen by now considering the output (Vo)' of summing amplifier 224 as (H) varies from the $H_{BP}$ altitude (0.2 kilometers) to $H_{max}$ altitude (4 kilometers).

Figures 6, 7:
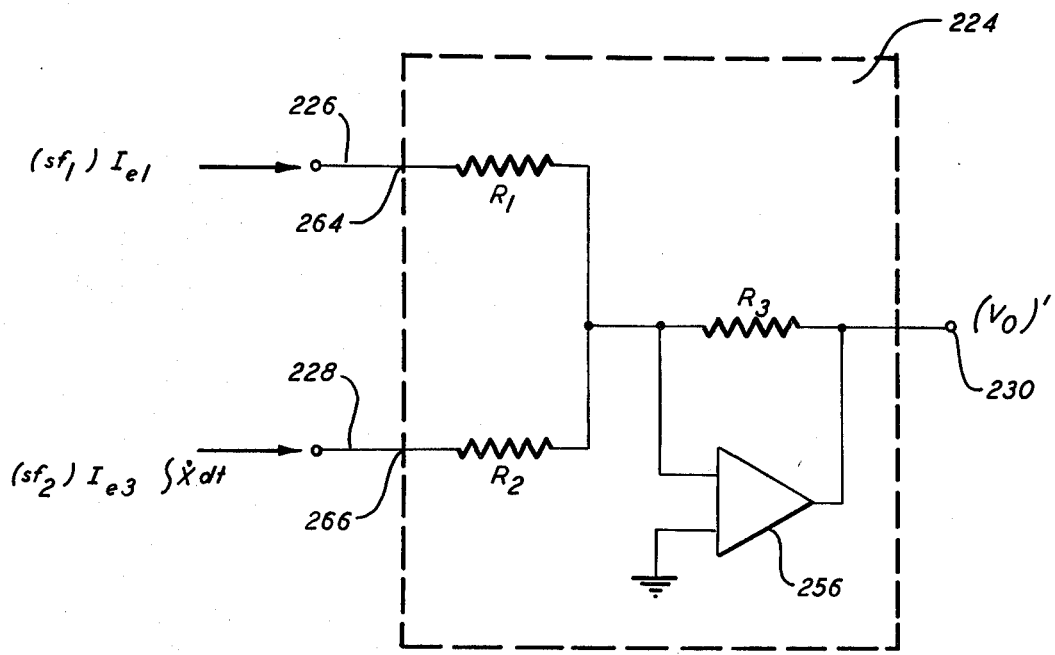
FIG. 6 is a schematic representation of a summing amplifier employed in the present invention.
FIG. 7 is a table relating summing amplifier output as a function of scaled altitude signals.

Referring to FIG. 6 summing amplifier 224 consists of operational amplifier 256, feedback resistor $R_3$ 258 and input resistors $R_1$ and $R_2$. The $(sf_1) I_{e1}$ signal is fed by line 226 to one input 264 of the summing amplifier which connects to input resistor $R_1$. The (sf$_2$) $I_{e3} \int_0^t \dot{x}\, dt$ signal is fed by line 228 to the second input 266 of the summing amplifier which connects to input resistor $R_2$.

Values of input resistors $R_1$ and $R_2$ are routinely established to balance the two input signals to the summing amplifier such that signals at one port corresponding to one set of dimensions can be added to the signals at the second port corresponding to a second set of dimensions. For example, if one volt corresponded to one kilometer on line 226 and one volt corresponded to 10 kilometers on line 228 a direct summation of the two signals would not yield a proper result. A proportion can therefore be established relating the two input signals by the input resistors namely:

$$\frac{(sf_1)I_{e1}}{(sf_2)I_{e3} \times dt} = \frac{R_1}{R_2} \tag{9}$$

since $(sf_1) = (f_1)\frac{1}{(F_1)}$ and $(sf_2) =$ $(F_2)\frac{1}{f_2}$ it can be seen that $(f_1)(f_2) = h$.

With (h) and $\int_0^t \dot{x}\, dt$ being distances, then $$R_2 = F_1 F_2 R_1 \tag{10}$$

The ratio of the input resistances is then proportional to the product of the maximum values of the terms $f_1$ and $f_2$.

The feedback resistor $R_3$ is then established such that the summation voltage output (Vo)' at point 230 is less than or equal to the maximum operational amplifier level so as to calibrate the amplifier output value to be peak for at least one input combination. The gain of the operational amplifier 256 can be expressed as a ratio of its feedback resistor $R_3$ to either of its input resistors, $R_1$ or $R_2$. Since the operational amplifier 256 will be summing the voltages incident upon summing amplifier 224 then:

$$(Vo)' = A(I_e f_1 + 1/f_2 I_{e3} \int \dot{x}\, dt) \tag{11}$$

where A is a constant voltage value within which can be absorbed the maximum voltage constants 1/$F_1$ and $F_2$. A will also correspond to each of the individual input line gains. Each of the input lines have typically different gains since the values that each line voltage represent have different sets of dimensions as hereinbefore discussed.

From equation (11)
with (sf$_1$)=($f_1/F_1$), (sf$_2$)=($F_2/f_2$), H=($F_1$) ($F_2$), and a typical 10 volt maximum operational amplifier then:

$$(Vo)' = A(I_{e1}f_1 + \frac{1}{f_2} I_{e3} \int \dot{x}\, dt) \leq 10 \text{ volts} \tag{12}$$

$$\text{then } A = \frac{10}{I_{e1}f_1 + \left(\frac{I_{e3} \int \dot{x}\, dt}{f_2}\right)} \text{ yielding} \tag{13}$$

$$A = \frac{10 \sqrt{H_{min}}}{1 + (\sqrt{H_{min}} \sqrt{H_{max}})} \tag{14}$$

with $H_{min}=0.01$ kilometers and $H_{max}=4$ kilometers, then $A=0.883$ Since A also corresponds to each of the individual input line gains then $$I_{e1} \frac{(f_1)}{F_1} \frac{(R_3)}{R_1} = AI_{e1}f_1 \tag{15}$$

$$\text{or } R_3 = R_1 F_1 \frac{10 \sqrt{H_{min}}}{(1 + \sqrt{H_{min}} \sqrt{H_{max}})} \tag{16}$$

therefore choosing $R_1$ arbitrarily to be 1K ohms then $R_2 = (F_1)(F_2) K$ ohms $\tag{17}$ $$\text{since } F_1 = \frac{H_{max}(1 + \sqrt{H_{min}} \sqrt{H_{max}})}{\sqrt{H_{min}}(H_{max} + 1)} = 9.6 \tag{18}$$

$$\text{and } F_2 = \frac{\sqrt{H_{min}}(\sqrt{H_{min}} \sqrt{H_{max}} + 1)}{(1 + \sqrt{H_{min}} \sqrt{H_{max}})} = .1 \tag{19}$$

then $R_2=0.96K$ ohms and $R_3=8K$ ohms.

Knowing A, $R_1$, $R_2$, $R_3$, $I_{e1}$, and $I_{e3}$ and that typically $\int \dot{x}\, dt = 1$ we can then determine the values of (Vo)' as a function of altitude.

Figure 8:
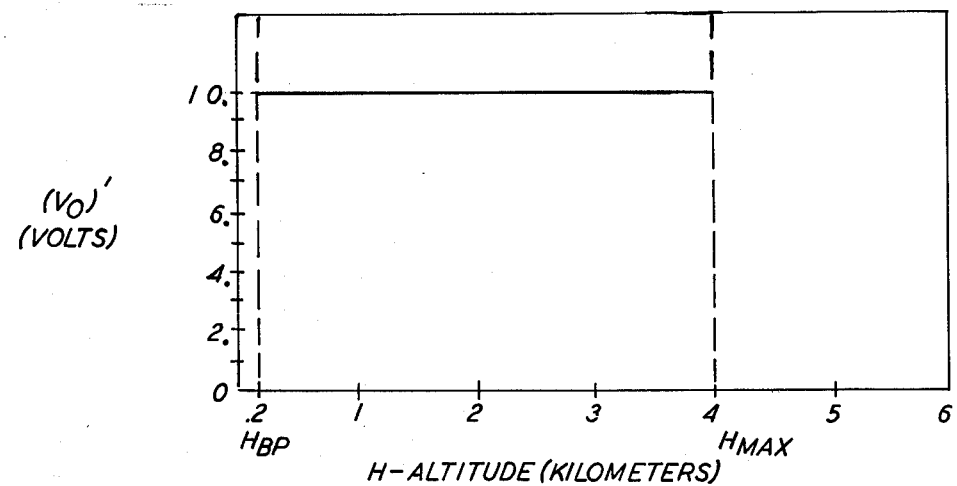
FIG. 8 is a graph showing summing amplifier output as a function of altitude.

Referring to FIG. 7, the value of (Vo)' is shown in a table as a function of altitude (H) in kilometers. The (h) signal has been converted into signals (sf$_1$) and (sf$_2$). The earth direction cosine voltage $I_{e1}$ and $I_{e3}$ are typically 1 volt max after processing by a multiplier, and $\int x\, dt=1$. The gain contribution from each line is established by $R_3/R_1$ and $R_3/R_2$ and the summation of terms yields (Vo)' volts. Over the range from 4 kilometers to 0.2 kilometers, the selected altitude range, the scaling functions (sf$_1$) and (sf$_2$) have allowed an output voltage (Vo)' to be essentially 10 volts, the maximum signal strength allowed by the operational amplifier. The present invention has achieved a strong signal, the optimum allowable for the selected altitude range. FIG. 8 shows the value of (Vo)' over the selected altitude range.

The improved video generator has been described over a selected altitude range from $H_{BP}$ to $H_{max}$. In a further extension of the preferred embodiment of the present invention new scaling functions related to the first and second scaling functions are generated for altitude values outside the selected altitude range. Resulting new signals would be almost as strong as those in the selected altitude range and still much stronger than those signals representative of the altitude (H). It would allow wider altitude range operation than the selected altitude range alone allows, while still enjoying strong signal magnitudes for defining the null relationships.

Figure 9A:
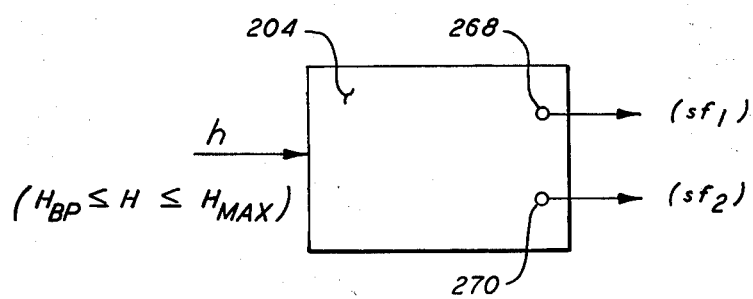
FIGS. 9A and 9B are block diagrams of the source of the scaling function signal.

Referring to FIG. 9A, from signals (h) representative of altitude (H) for altitude range $H_{BP}$ to $H_{max}$ a portion of computer 204 generates signals (sf$_1$) and (sf$_2$) from ports 268 and 270 respectively. Computer logic capabilities can easily allow the (sf$_1$) and (sf$_2$) terms to change to related functions when values of altitude are outside the previously described selected altitude range. In this embodiment the same components of FIG. 5 are employed, however computer 204 will contain standard logic means to determine if (H) is within the selected altitude range or not. If (H) is within the selected range the first and second scaling functions will be generated. If it is not within the selected altitude range then the scaling function signals will be replaced by the new scaling function signals.

Figure 9B:
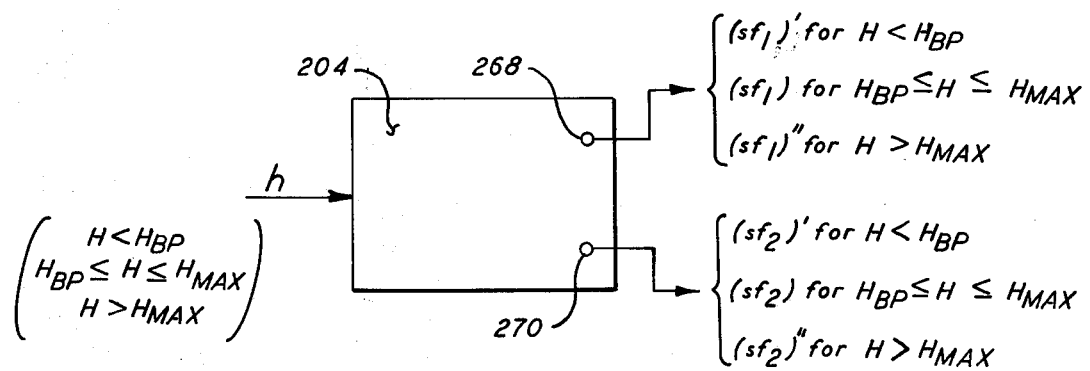

As shown in FIG. 9B the signals $(sf_1)$ and $(sf_2)$ will change in accordance with the altitude location of (H) relative to the selected altitude range. Port 268, instead of simply producing $(sf_1)$ signals, will produce the following signals:

$(sf_1)'$ for $H < H_{BP}$
$(sf_1)$ for $H_{BP} \leq H \leq H_{max}$
$(sf_1)''$ for $H > H_{max}$ where $(sf_1)' = (sf_1)_{HBP}(H/H_{BP})$ and $(sf_1)_{HBP}$ is the value of $(sf_1)$ at altitude $H_{BP}$, and $(sf_1)'' = (sf_1)_{Hmax}$ where $(sf_1)_{Hmax}$ is the value of $(sf_1)$ at altitude $H_{max}$.

Port 270, instead of simply producing $(sf_2)$ signals will produce the following signals:

$(sf_2)'$ for $H < H_{BP}$
$(sf_2)$ for $H_{BP} \leq H \leq H_{max}$
$(sf_2)''$ for $H > H_{max}$ where $(sf_2)' = (sf_2)_{HBP}$ and $(sf_2)_{HBP}$ is the value of $(sf_2)$ at altitude $H_{BP}$ and $(sf_2)'' = (sf_2)_{Hmax}(H_{max}/H)$ where $(sf_2)_{Hmax}$ is the value of $(sf_2)$ at altitude $H_{max}$.

Figure 10:
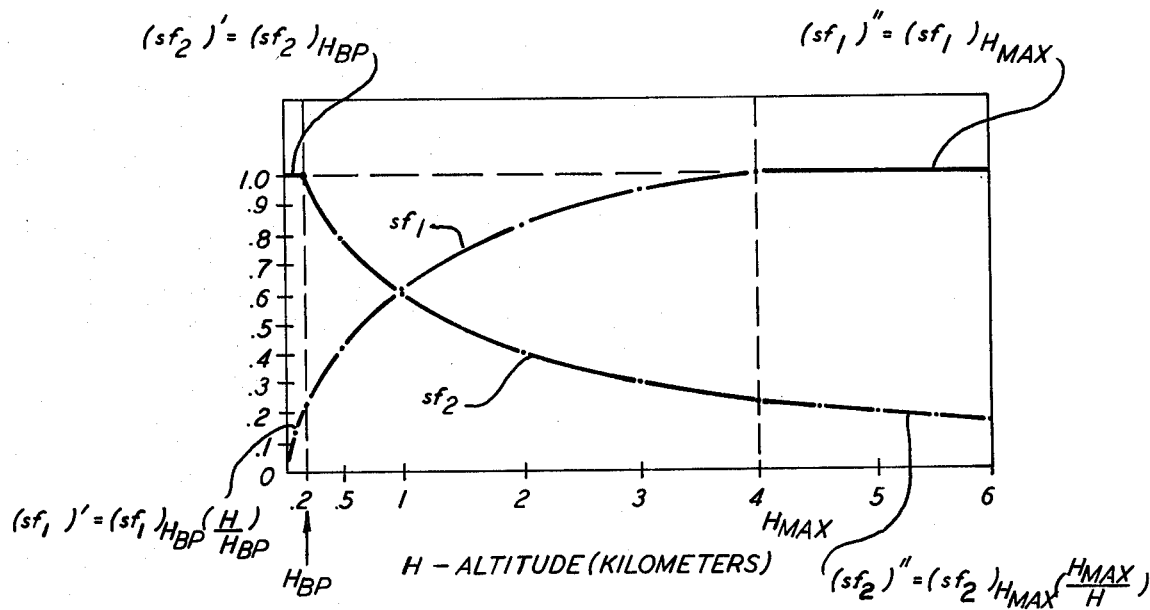
FIG. 10 is a graph showing scaling function signals as a function of altitude.

FIG. 10 shows functions $(sf_1)$, $(Sf_1)'$, $(sf_1)''$, $(sf_2)$, $(sf_2)'$, $(sf_2)''$ over a wide range of altitudes from 0 to 6.0 kilometers. Range 0 to 0.2 kilometers employs $(sf_1)'$ and $(sf_2)'$; Range 0.2 to 4.0 kilometers employs $(sf_1)$ and $(sf_2)$. Range 4.0 to 6.0 kilometers employs $(sf_1)''$ and $(sf_2)''$.

Figure 11:
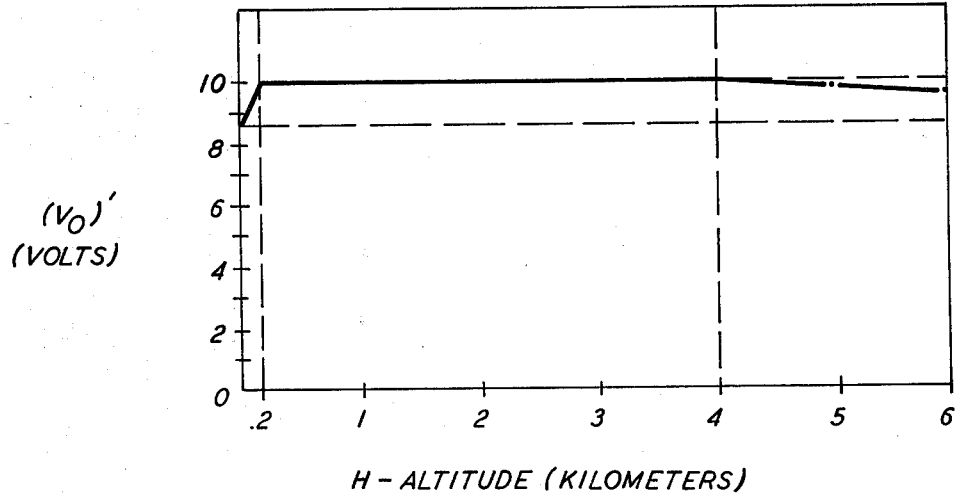
FIG. 11 is a graph showing summing amplifier output as a function of altitude.

Using the new scaling functions the output voltage $(Vo)'$ can be established in the same manner as had been previously discussed for the selected altitude range. FIG. 11 shows the voltage $(Vo)'$ over the entire 0 to 6 kilometer altitude range. In this embodiment $(Vo)'$ never gets below the value of 8.33 volts. A strong signal can therefore be present for the null relationship comparison over a very wide range of altitudes.

This invention has been described in terms of specific altitude ranges. However it will be readily apparent to those skilled in the art that this invention can be practiced employing various other altitude ranges. It will also be apparent to those skilled in the art that various changes and modifications may be made without departing from the invention. For instance, function generators could be employed to generate the scaling functions instead of employing a computer. Mathematical approximations of the specific functional relationships could be derived which produce essentially the same functions. The invention is, therefore, intended to cover all such changes and modifications as fall within the true spirit and scope of the invention as defined by the appended claims. What is claimed is:

1. In a synthetic terrain generator which provides on a viewing surface of a display means, a simulated view from an eyepoint in an aircraft or the like, of a synthetic terrain having a plurality of grid lines in a reference plane, an improved video generator of the type which generates signals electronically defining null relationships, which are representative of an intersection of a line of sight from the eyepoint with a grid line, and provides a video pulse to the display means when horizontal and vertical earth direction cosine signals and signals representative of the altitude and horizontal velocity of the aircraft concurrently have values in accordance with the null relationships, wherein the improvement comprises:

(a) means to convert a signal representative of the altitude of the aircraft into a first scaling function signal $(sf_1)$ and a second scaling function signal $(sf_2)$ where each of the said functions are related to the signal representative of the altitude of the aircraft;

(b) first scaling means responsive to the first of said scaling function signals and said horizontal earth direction cosine signal to provide a scaled horizontal earth direction cosine signal proportional to said first scaling function signal;

(c) second scaling means responsive to the second of said scaling function signals and said vertical earth direction cosine signal to provide a scaled vertical earth direction cosine signal proportional to said second scaling function signal; and (d) means responsive to said scaled earth direction cosine signals and signals representative of the horizontal velocity of the aircraft for electronically defining said null relationships, whereby said scaling provides improved signal strength magnitudes representative of terms of said null relationships so that signal processing over a selected altitude range will result in an accurate depiction of the synthetic terrain as the eyepoint varies from a minimum value of the selected altitude range to a maximum value of the selected altitude range.

2. The improved video generator of claim 1 wherein the means responsive to said scaled earth direction cosine signals and signals representative of the horizontal velocity of the aircraft comprises:

(a) velocity conversion means to convert said signal representative of the horizontal velocity into a signal representative of the horizontal translation of the aircraft;

(b) multiplying means responsive to said signal representative of the horizontal translation of the aircraft and said scaled vertical earth direction cosine signals for establishing a product signal of said signal representative of the horizontal translation of the aircraft and said scaled vertical earth direction cosine signal;

(c) combining means responsive to said scaled horizontal earth direction cosine signal and said product signal to sum said scaled horizontal earth direction signal and said product signal in proper proportions so as to establish a strong signal representative of the line of sight intersection point on said reference plane;

(d) a plurality of attenuation means each responsive to said scaled vertical earth direction cosine signal for defining a strong signal from each attenuation means representative of a grid line;

(e) a plurality of comparison means each responsive to said strong signals representative of the line of sight intersection point on said reference plane and one of said strong signals representative of a grid line each of which provides a distinct output signal when a null occurs clearly defining that the line of sight intersects a point on one of said grid lines; and (f) reset means connected to said comparison means such that when said output signal occurs the reset means will reset said velocity converstion means to zero voltage to prevent any translation away from the grid lines by said velocity conversion means.

3. The improved video generator of claim 2 wherein said first scaling function signal $(sf_1)$ comprises a signal related to the signal representative of the altitude of the aircraft by an expression or approximation essentially of a form defined by the relationship:

$$(sf_1) = (f_1)1/F_1)$$

and a second scaling function signal (sf$_2$) comprises a signal (sf$_2$) related to the signal representative of the altitude of the aircraft by any expression or approximation essentially of a form defined by the relationship:

$$(sf_2) = \frac{1}{(f_2)}(F_2) \text{ where } f_1 = \frac{(H(1 + \sqrt{H_{min}}\sqrt{H_{max}}))}{\sqrt{H_{min}}(H+1)}$$

and F$_1$ is the maximum value of f$_1$, where $$f_2 = \frac{\sqrt{H_{min}}(H+1)}{(1 + \sqrt{H_{min}}\sqrt{H_{max}})}$$

and F$_2$ is the maximum value of f$_2$, and where h is the altitude, H$_{max}$ is a maximum altitude in the selected altitude range, H$_{min}$ is an altitude value related to H$_{max}$ by an expression or approximation essentially of a form defined by the relationship $\sqrt{H_{min}} = H_{BP}/\sqrt{H_{max}}$ where H$_{BP}$ is a minimum altitude in the said selected altitude range.

4. The improved video generator of claim 3 further comprising:
   (a) means for providing a low altitude first scaling function signal (sf$_1$)' at altitude ranges less than the said H$_{BP}$ value where said (sf$_1$)' signal is related to said first scaling function signal by an expression or approximation essentially of a form defined by the relationship:

$$(sf_1)' = (sf_1)_{H_{BP}}(H/H_{BP})$$

where: (sf$_1$)$_{H_{BP}}$ is the value of (sf$_1$) at altitude H$_{BP}$
   (b) means for providing a high altitude first scaling function signal (sf$_1$)'' at altitude ranges greater than said H$_{max}$ value where said (sf$_1$)'' signal is related to said first scaling function signal by an expression or approximation essential of the form defined by the relationship:

$$(sf_1)'' = (sf_1)_{H_{max}}$$

where (sf$_1$)$_{H_{max}}$ is the value of (sf$_1$) at altitude H$_{max}$; and
   (c) means for providing a low altitude second scaling function signal (sf$_2$)' at altitude ranges less than the said H$_{BP}$ value where said (sf$_2$)' signal is related to said first scaling function signal by an expression or approximation essentially of the form defined by the relationship:

$$(sf_2)' = (sf_2)_{H_{BP}}$$

where (sf$_2$)$_{H_{BP}}$ is the value of (sf$_2$) at altitude H$_{BP}$;
   (d) means for providing a high altitude second scaling function signal (sf$_2$)'' at altitude ranges greater than said H$_{max}$ value where said (sf$_2$)'' signal is related to said second signal function signal by an expression or approximation essentially of the form defined by the relationship:

$$(sf_2)'' = (sf_2)_{H_{max}}(H_{max}/H)$$

where (sf$_2$)$_{H_{max}}$ is the value of (sf$_2$) at altitude H$_{max}$; and
   (e) logic means responsive to the signal representative of the altitude of the aircraft which selects either signal (sf$_1$), (sf$_1$)' or (sf$_1$)'' to be fed to said means responsive to said first scaling function for scaling said horizontal earth direction cosine signal and which selects either (sf$_2$), (sf$_2$)' or (sf$_2$)'' to be fed to said means responsive to said second scaling function for scaling said vertical earth direction cosine signal such that improved signal strength magnitudes of terms defining said null relationship can be provided for any extended altitude range in excess of said selected altitude range.

5. The improved video generator of claim 3 comprises a computer to provide said first scaling function signal and said second scaling function signal.

6. The improved video generator of claim 4 comprising a computer to provide means for providing a low altitude first scaling signal (sf$_1$)', means for providing a first scaling function signal (sf$_1$), means for providing a high altitude first scaling function signal (sf$_1$)'', means for providing a low altitude second scaling function signal (sf$_2$)', means for providing said second scaling function (sf$_2$), means for providing a high altitude second scaling function signal (sf$_2$)'', and logic means which selects either signal (sf$_1$), (sf$_1$)' or (sf$_1$)'' and either signal (sf$_2$), (sf$_2$)' or (sf$_2$)''.

7. In a synthetic terrain generating process, in which a simulated view from an eyepoint or the like of a synthetic terrain having a plurality of grid lines in a reference plane is provided on a viewing surface of display means, an improved method of electronically generating signals defining null relationships, which are representative of an intersection of a line of sight from the eyepoint with a grid line, and providing a video pulse to the display means when horizontal and vertical earth direction cosine signals and signals representative of the altitude and horizontal velocity of the aircraft concurrently have values in accordance with the null relationships, wherein the improvement comprises the steps of:
   (a) converting a signal representative of the altitude of the aircraft into a first scaling function signal (sf$_1$) and a second scaling function signal (sf$_2$) where each of said functions are related to the signal representative of the altitude of the aircraft;
   (b) scaling said horizontal earth direction cosine signals in proportion to said first scaling function signal;
   (c) scaling said vertical earth direction cosine signal in proportion to said second scaling function;
   (d) electronically defining said null relationships in terms of signals representative of said scaled horizontal earth direction cosine signals, signals representative of said scaled vertical earth direction cosine signals, and signals representative of the horizontal velocity of the aircraft, whereby said scaling provides improved signal strength magnitudes such that signal processing over a selected altitude range will result in a clearly defined line of sight intersection with a grid line as the eyepoint varies from a minimum value of said selected altitude range to a maximum value of said selected altitude range.

8. The improved method of electronically generating signals of claim 7 wherein the step of converting a signal representative of the altitude of the aircraft into a first scaling function signal and a second scaling function signal further comprises the steps of defining said first scaling function signal (sf$_1$) by an expression or approximation essentially of a form:

$$(sf_1) = (f_1) 1/F_1)$$

and defining said second scaling function signal (sf₂) by an expression or approximation essentially of a form:

$$(sf_2) = \frac{1}{(f_2)} (F_2)$$

where $f_1 = \dfrac{H(1 + \sqrt{H_{min}}\sqrt{H_{max}})}{H_{min}(H+1)}$ and $F_1$ is the maximum value of $(f_1)$ where $f_{2''} = \dfrac{\sqrt{H_{min}}(H+1)}{(1 + \sqrt{H_{min}}\sqrt{H_{max}})}$ and $F_2$ is the maximum value of $(f_2)$, and where H is the altitude, $H_{max}$ is a maximum altitude in a selected altitude range, $H_{min}$ is an altitude value related to $H_{max}$ by an expression or approximation essentially of a form defined by the relationship $\sqrt{H_{min}} = H_{BP}/\sqrt{H_{max}}$ where $H_{BP}$ is a minimum altitude in the said selected altitude range.

9. The improved method of electronically generating signals of claim 8 further comprising the step of:
    (a) providing a low altitude first scaling function signal (sf₁)' at altitude ranges less than the said $H_{BP}$ value where said (sf₁)' signal is related to said first scaling function signal by an expression or approximation essentially of a form defined by the relationship: $(sf_1)' = (sf_1)_{H_{BP}} H/H_{BP}$ where $(sf_1)_{H_{BP}}$ is the value of (sf₁) at altitude $H_{BP}$.
    (b) providing a high altitude first scaling function signal (sf₁)" at altitude ranges greater than $H_{max}$ where said (sf₁)" signal is related to said first scaling function signal by an expression or approximation essentially of the form defined by the relationship: $(sf_1)'' = (sf_1)_{H_{max}}$ where $(sf_1)_{H_{max}}$ is the value of (sf₁) at altitude $H_{max}$;
    (c) providing a low altitude second scaling function signal (sf₂)' at altitude ranges less than the said $H_{BP}$ value where said (sf₂)' signal is related to said first scaling function signal by an expression or approximation essentially of the form defined by the relationship: $(sf_2)' = (sf_2)_{H_{BP}}$ where $(sf_2)_{H_{BP}}$ is the value of (sf₂) at altitude $H_{BP}$;
    (d) providing a high altitude second scaling function signal (sf₂)" at altitude ranges greater than said $H_{max}$ value where said (sf₂)" is related to said second scaling function signal by an expression or approximation essentially of the form defined by the relationship: $(sf_2)'' = (sf_2)_{H_{max}}(H_{max}/H)$ where $(sf_2)_{H_{max}}$ is the value of (sf₂) at altitude $H_{max}$; and
    (e) providing logic means responsive to the signal representative of the altitude of the aircraft which selects either signal (sf₁), (sf₁),', or (sf₁)" for scaling said horizontal earth direction cosine signals and which selects either signal (sf₂), (sf₂)' or (sf₂)" for scaling said vertical earth direction cosine signal such that improved signal strength magnitudes of terms defining said null relationships can be provided for any extended altitude range in excess of said selected altitude range.

10. The improved method of electronically generating signals of claim 8 further comprising the step of providing said first and second scaling function signals by computer means 11. The improved method of electronically generating signals of claim 9 further comprising the step of providing signals (sf₁), (sf₁)', (sf₁)", (sf₂), (sf₂)', (sf₂)" and said logic means by computer means.

* * * * *

UNITED STATES PATENT AND TRADEMARK OFFICE
CERTIFICATE OF CORRECTION

PATENT NO. : 4,173,081　　　　　　　　　Page 1 of 3
DATED : November 6, 1979
INVENTOR(S) : Maurice Millard et al It is certified that error appears in the above-identified patent and that said Letters Patent are hereby corrected as shown below:

Column 7, line 55, formula "$H = (F_1)(F_2)$" should read

--$H = (f_1)(f_2)$--.

Column 9, line 22, that portion of the line reading "$(Sf_1)$" should read

--$(sf_1)$--.

Column 11, line 1, delete the word "a" (first occurrence) and substitute therefor --said--;

line 34, insert --;-- after $H_{BP}$ at the end of the line;

line 39, delete the word "essential" and substitute therefor

--essentially--;

line 45, delete the word "and";

line 49, delete the word "first" and substitute therefor

--second--.

Substitute for Claim 5, the following:

--5. The improved video generator of Claim 3 wherein said means to convert a signal representative of the altitude of the aircraft comprises a computer to provide said first scaling function signal and said second scaling function signal.--

UNITED STATES PATENT AND TRADEMARK OFFICE
CERTIFICATE OF CORRECTION

PATENT NO. : 4,173,081
DATED : November 6, 1979
INVENTOR(S) : Maurice Millard et al It is certified that error appears in the above-identified patent and that said Letters Patent are hereby corrected as shown below:

Substitute for Claim 6, the following:

--6. The improved video generator of Claim 4 wherein said means for providing a low altitude first scaling signal $(sf_1)'$, said means for providing a first scaling function signal $(sf_1)$, said means for providing a high altitude first scaling function signal $(sf_1)''$, said means for providing a low altitude second scaling function signal $(sf_2)'$, said means for providing said second scaling function $(sf_2)$ said means for providing a high altitude second scaling function signal $(sf_2)''$, and said logic means which selects either signal $(sf_1)$, $(sf_1)'$ or $(sf_1)''$ and either signal $(sf_2)$, $(sf_2)'$ or $(sf_2)''$ comprise a computer.--

Column 13, line 33, formula "$(sf_1)' = (sf_1) H_{BP} H/H_{BP}$ should read --$(sf_1)' = (sf_1) H_{BP} (H/H_{BP})$--.

line 34, delete ". ." and substitute therefor --;--.

UNITED STATES PATENT AND TRADEMARK OFFICE
CERTIFICATE OF CORRECTION

PATENT NO. : 4,173,081

DATED : November 6, 1979

INVENTOR(S) : Maurice Millard et al

It is certified that error appears in the above-identified patent and that said Letters Patent are hereby corrected as shown below:

Column 13, line 33, formula "$(sf_1)' = (sf_1) H_{BP} H/H_{BP}$ should read

--$(sf_1)' = (sf_1) H_{BP} (H/H_{BP})$--.

line 34, delete ". ." and substitute therefor --;-- .

Signed and Sealed this

Fifteenth Day of July 1980

[SEAL]

Attest:

SIDNEY A. DIAMOND

Attesting Officer

Commissioner of Patents and Trademarks